United States Patent [19]

Blanes et al.

[11] Patent Number: 5,776,229
[45] Date of Patent: Jul. 7, 1998

[54] OIL SEPARATOR ROTOR FOR LUBRICATION ENCLOSURE

[75] Inventors: Gérard Antoine Gilbert Blanes, Ris Orangis; René Joseph Antoine Cannavo, Maincy; Jean Bernard Forgue, Saint Mery; Francis Georges Albert Garnier, Bombon; Michel Georges Hugues, Boise le Roi; Gilles Claude Gabriel Massot, Voisenon; Patrick Charles Georges Morel, Chartrettes; Carole Claudine Touron, Vert le Petit, all of France

[73] Assignee: Societe Nationale d'etude et de Construction de Moteurs d'Aviation "Snecma", Paris, France

[21] Appl. No.: 764,450

[22] Filed: Dec. 12, 1996

[30] Foreign Application Priority Data

Dec. 20, 1995 [FR] France ................... 95 15121

[51] Int. Cl.⁶ .................................................. B01D 19/00
[52] U.S. Cl. .................... 96/188; 55/407; 55/409; 95/270; 96/216
[58] Field of Search .................... 55/406, 407, 408, 55/409; 95/261, 270; 96/177, 178, 187, 188, 189, 216

[56] References Cited

U.S. PATENT DOCUMENTS

| 2,425,410 | 8/1947 | Zeitlin et al. | 55/409 |
|---|---|---|---|
| 3,561,195 | 2/1971 | Bouru | 55/409 |
| 3,999,965 | 12/1976 | Burgess | 96/188 |
| 4,049,401 | 9/1977 | Smith | 55/409 |
| 4,113,452 | 9/1978 | Brown et al. | 96/216 |
| 4,329,968 | 5/1982 | Ishikawa et al. | |
| 4,994,097 | 2/1991 | Brouwers | 55/408 |
| 5,073,177 | 12/1991 | Brouwers | 55/408 |
| 5,344,382 | 9/1994 | Pelzer | 96/216 |

FOREIGN PATENT DOCUMENTS

| 0 286 160 | 10/1988 | European Pat. Off. | |
| 620 108 | 4/1927 | France . | |
| 1203718 | 1/1960 | France | 55/408 |
| 1 502 216 | 10/1967 | France . | |
| 2 696 655 | 4/1994 | France . | |
| 700100 | 12/1940 | Germany | 55/408 |
| 1058212 | 2/1967 | United Kingdom . | |
| WO 94/23823 | 10/1994 | WIPO . | |

*Primary Examiner*—C. Scott Bushey
*Attorney, Agent, or Firm*—Oblon, Spivak, McClelland, Maier & Neustadt, P.C.

[57] ABSTRACT

Oil separator rotor located in an enclosure provided with an oil reinjection system for lubricating a bearing. The oil separator rotor, which dries the excess air passing out of the enclosure, acts by aiding the deposition of suspended oil on the walls of a lining or packing of the rotor. The lining is a honeycomb material cartridge offering easy separation without excessive pressure losses. The rotor is assembled by bolts, which interconnect the end plates traversing the lining.

3 Claims, 2 Drawing Sheets

OIL SEPARATOR ROTOR FOR LUBRICATION ENCLOSURE

BACKGROUND OF THE INVENTION

1. Field of the Invention

The invention relates to an oil separator rotor for a lubrication enclosure.

2. Discussion of the Background

Certain turbine engine bearings installed between a rotor and a stator are lubricated by oil sprayed into an enclosure containing the bearing and whose access is restricted by labyrinth seals located at the junction of the fixed and rotary parts of the enclosure. The function of the labyrinth seals is to prevent a flow of oil out of the enclosure by making the same flow in a sinuous path and they are completed by an air flow passing through the same towards the enclosure.

Said air must then be discharged, but as it has become charged with oil mist on passing through the enclosure, it could then pollute the environment into which it would be discharged or could even give rise to fires upon contacting hot parts of the engine. Moreover, the oil would soon be used up in the enclosure and lubrication would be compromised. It is for this reason that an oil separator or oil trap must be located at the enclosure outlet. Its function is to dry the discharged air separating from it the oil contained therein in suspended form and to return the collected oil to the interior of the enclosure.

An oil separator is generally a rotor formed by a rotary ring or collar, which surrounds outlet ports of the enclosure leading to a low pressure area. The oil-containing air is made to pass through the collar and leave the latter and then the enclosure, by a centripetal flow while giving off its oil, which is deposited on the lining of the collar prior to being ejected by the centrifugal forces produced by the rotation of the collar.

In French patent 2 696 655 the rotor is a casing filled with balls, while in British patent 1 508 212 a porous padding is used as the oil deposition lining.

SUMMARY OF THE INVENTION

The object of the invention is to use a rotor structure having a high vacuum level and which at the same time is inexpensive and light, because use is made of a honeycomb structure, already widely used in the technical field in question for other applications, particularly as an element of composite materials or as an abradable lining of seals.

A separation rotor constructed with a honeycomb separating lining is described in WO-A-94 23823. Under these conditions, the object of the invention is to propose a more easily constructable rotor and which is more particularly based on the use of assembly bolts permitting both the joining together of the end plates of the rotor and the maintaining in place of the sealing lining, by retaining the same in particular against centrifugal forces. The rotor according to the invention is intended to separate the suspended oil in a centripetal air flow passing through the rotor. It is in the form of a ring or collar having a separating lining in the form of a honeycomb structure comprising axial air flow passages and two planar plates between which the lining extends, one of the plates being located on the air intake side in the lining and is perforated in front of the lining and the other plate is solid and separated from the lining. It is characterized in that the plates are assembled by bolts passing through the lining and in that spacers are placed around the bolts between the lining and the solid plate.

BRIEF DESCRIPTION OF THE DRAWINGS

The invention is described in illustrative and non-limitative manner hereinafter with reference to the attached drawings, wherein show.

DESCRIPTION OF THE PREFERRED EMBODIMENTS

Figure 1:
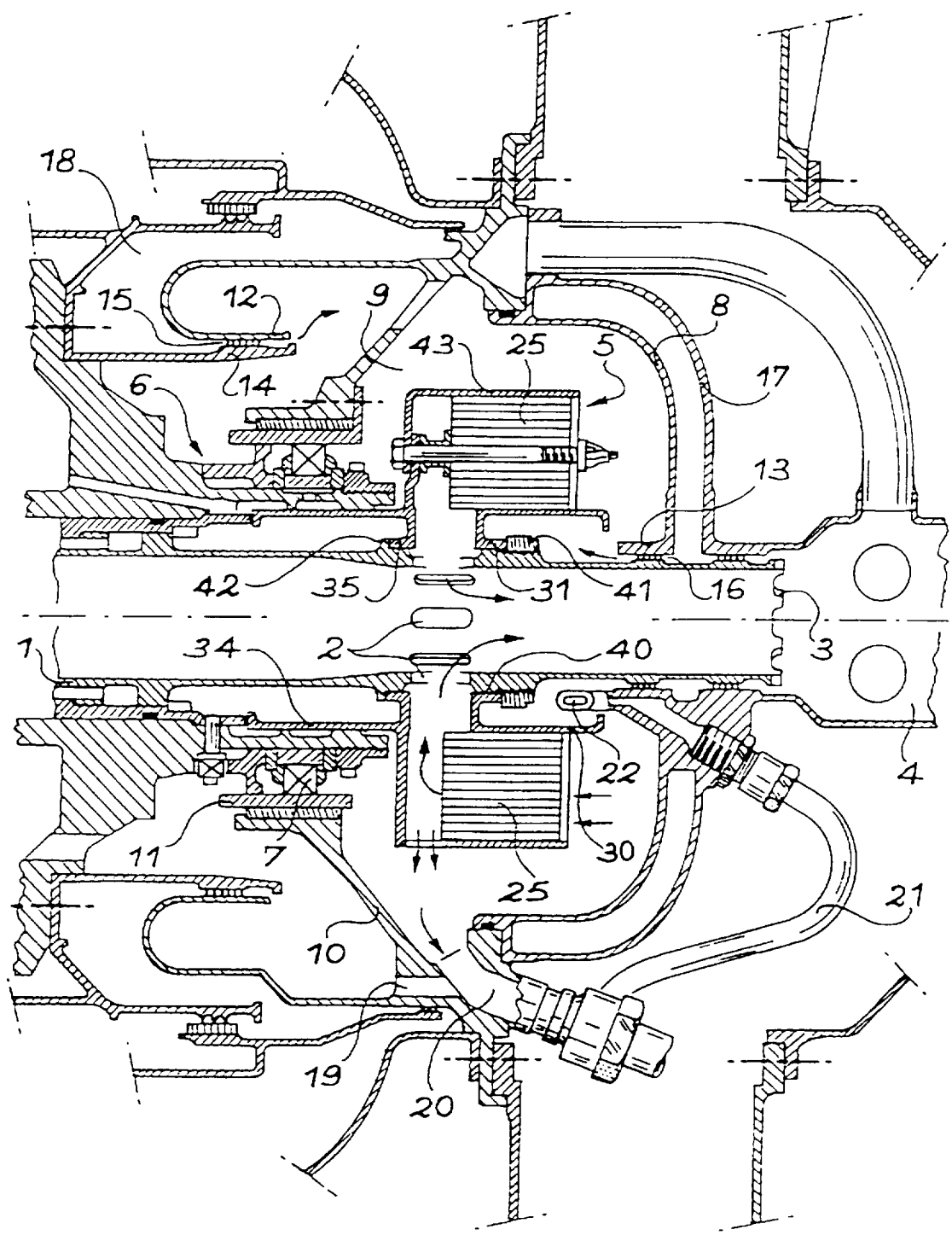
FIG. 1 illustrates general view of a bearing in which the invention is used.

At present there are two oil separators on such turbojet engines. They are located at the ends of the transmission shaft, one at the front close to the bearing of the fan section and the other to the rear close to the turbine bearing. It is the latter part which is shown in FIG. 1, the transmission shaft 1. It is pointed out that it is hollow and has a circle of orifices 2 formed through its wall and is open at its rear end 3, which communicates with a chamber 4 under atmospheric pressure.

Finally, the shaft 1 carries and rotates the oil separator rotor 5 according to the invention and, upstream thereof, a support equipment 6 for the inner race of a bearing 7 to be lubricated.

Opposite said rotary parts there is a fairing 8 integral with the turbojet engine stator and which surrounds the oil separator rotor 5 and the bearing 7 in order to enclose them in an enclosure 9 which it forms with the shaft 1 and the support equipment 6. The fairing 8 carries a conical rib 10 terminated by support equipment 11 of the outer race of the bearing 7. Said rib 10 is perforated so as not to divide off the enclosure 9. At its ends, the fairing 8 also carries two cylindrical flanges 12 and 13 passing respectively in front of a cylindrical flange 14 of the rotary support equipment 6 and a portion of the shaft 1. The clearances formed at these junctions are partly filled by labyrinth seals 15 and 16. The fairing 8 is also surrounded by an outer fairing 17 and the high pressure air from other parts of the engine is blown into the gap 18 between the fairings 8 and 17 prior to entering the enclosure 9 through the labyrinth seals 15 and 16.

The oil flowing on the walls of the front part of the enclosure 9 passes through a passage 19 made through the lowest portion of the rib 10 and issues in front of an oil receptacle 20. The oil coming from the front part of the enclosure 9 and the oil from the rear part and mainly the oil separator is accumulated in the oil receptacle 20, being recovered by the recovery pump.

The oil supply of the enclosure 9 takes place by means of an oil injection nozzle 22 located in the enclosure 9, against the shaft 1, close to the rear and not far from the oil separator rotor 5. The rotary movement of the shaft 1 and the adjoining parts makes the air of the enclosure 9 turbulent and aids the emulsifying of the oil. An air leak flow passes towards the atmospheric pressure chamber 4 traversing the oil separator rotor 5 and then the orifices 2 of the shaft 1. However, the air and emulsified oil separate and follow opposite paths to the outlet of the oil separator rotor 5, centripetal for the first and centrifugal for the second. The oil drops back into the enclosure 9 and the receptacle 20 for reasons which will now be described.

Figure 2:
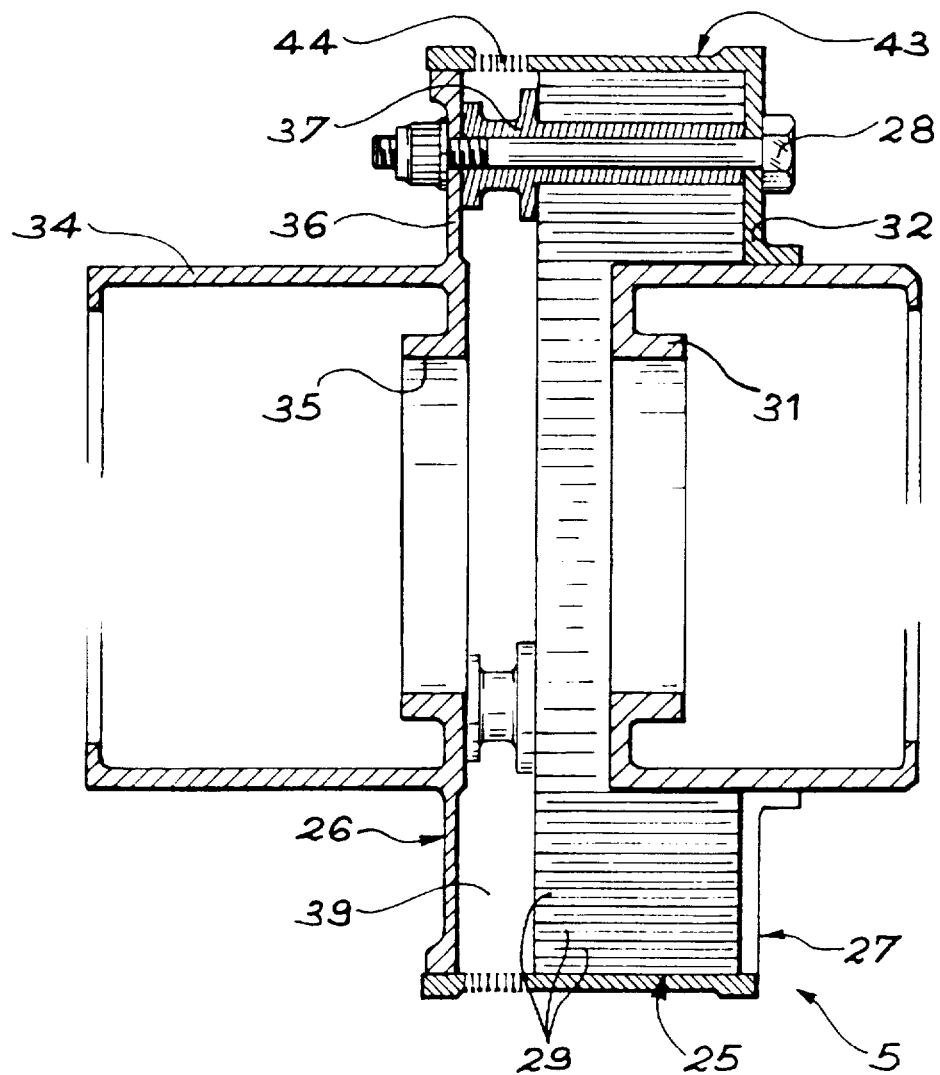
FIG. 2 shows isolated view of an oil separator rotor according to the invention.
Figure 3:
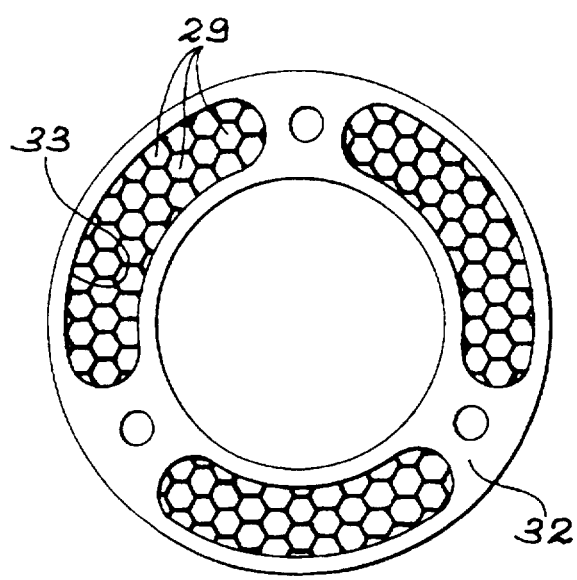
FIG. 3 shows another view of said rotor.

The oil separator rotor 5 is shown in isolated form in FIG. 2. Its main component is a cartridge 25 held in a front hub 26 and a cover 27 by axial bolts 28. The cartridge 25 is in the form of a collar or ring constituted by a honeycomb structure, i.e. formed by sheets defining rectilinear, hexagonal or polygonal cavities in general terms. The thickness of said cartridge 25 is adequate to ensure that the axially arranged cavities form very long channels 29 compared with the dimensions of their cross-section.

The cover 27 has a flange 32 shown in circular form here and having wide openings 33 through which the oil-containing air reaches the channels 29. The cover 27 also has a cylindrical portion 43 with orifices 44 through which the oil escapes. This cover covers the front hub 26.

As a result of the rotation of the oil separator rotor 5 there is an oblique path of the oil droplets within the channels 29 due to their inertia and said droplets are deposited on the walls thereof. The separation is then complete. The front hub 26 is also constituted by a cylindrical support plate 34 having inner flanges 31 and 35 placed on the shaft 1 and a planar, circular skirt 36 surrounding it. The skirt 36 is solid. Moreover, spacers 37 placed around the bolts 28 isolate the same from the cartridge 25. This leads to a circular channel 39 being formed between the skirt 36 and the cartridge 25 and communicating with the orifices 2 of the shaft 11. The dried air completes the path in the centripetal sense after leaving the cartridge 25 and reaches the shaft 1 and then the oil deposited on the walls of the cartridge 25 is entrained by the air passing through the channels 29 and dispersed by centrifugal forces on leaving the cartridge 25. The advantage of the honeycomb is that the channels 29 can be very fine or thin, which favours the trapping of the suspended oil and their length can be considerable, which has the same effect, but without the pressure losses being significant. Moreover, the cartridge 25 has a light weight, is inexpensive, can be easily constructed and also replaced should this prove necessary.

The flanges 31 and 35 can be slid onto a cylindrical bearing surface 40 of the shaft 1 are visible in FIG. 1, and can be jammed between a nut 41 and a flange adaptor 42 of said bearing surface 40. Thus, the oil separator rotor 5 is easy to install. The support plate 34 can be supported against the support equipment 6, which reinforces the stability of the installation and the injection nozzle 21 can issue between the shaft 1 and a plate of the hub 26 so as not to aid a premature flow of oil reinjected into the enclosure 9 through the oil separator rotor 5, which could be the case if it issued just upstream thereof.

Finally, a shell 43 surrounds the cartridge 25 and protects the latter, being placed between the skirts 32 and 36 and supported by any random one of them, either by means of bolts 28 (as shown in FIG. 1), or by a direct connection (as shown in FIG. 2). The shell 43 is obviously provided with openings 44 in correspondence with the circular channel 39.

The invention could be installed on other parts of the engine, particularly in the enclosure of the fan section bearing, which also has an oil separator rotor, as stated hereinbefore.

We claim:

1. Rotor for separating oil suspended in air flowing through the rotor with a centripetal flow, the rotor being in the form of a collar, comprising a separating lining in the form of a honeycomb structure having axial air flow passages and two planar plates between which extends said lining, one of the plates, located on an air entry side into the lining, being perforated upstream of the lining, while the other of the plates is solid and separated from the lining, a plurality of bolts interconnecting the plates, said bolts traversing the lining, and a plurality of spacers positioned around the bolts between the lining and the solid plate.

2. Separating rotor according to claim 1, wherein said rotor comprises cylindrical lateral edges resting on a rotary shaft.

3. Separating rotor according to claim 1, which comprises a shell protecting the lining and which surrounds the lining, the shell being supported by one of the plates and being perforated around said spacers.

* * * * *